United States Patent Office 3,522,436
Patented Aug. 4, 1970

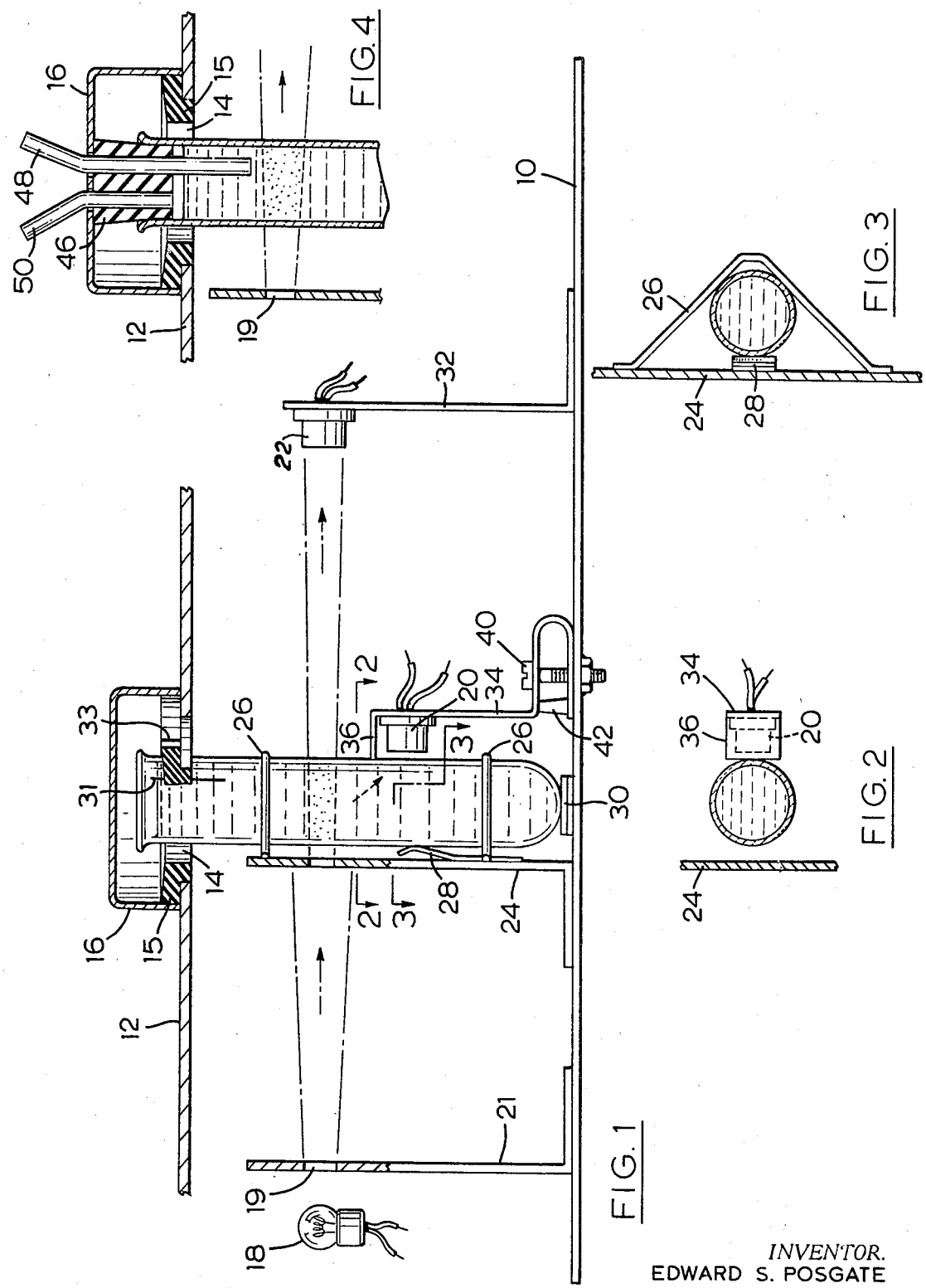

3,522,436
TURBIDIMETERS
Edward Salmon Posgate, 82 W. Deane Park Drive,
Islington, Ontario, Canada
Filed Feb. 17, 1969, Ser. No. 799,742
Int. Cl. G01n 15/06, 21/24
U.S. Cl. 250—218                    6 Claims

ABSTRACT OF THE DISCLOSURE

A turbidimeter adapted to receive a conventional test tube and having a test tube holding bracket consisting of a pair of vertically spaced angled bars and a spring for urging the test tube against the angles of the bars. Also included are two photocells: one for receiving the light scattered after passing through the sample and the other for properly positioning the test tube.

FIELD OF INVENTION

This invention relates to turbidimeters and is particularly concerned with a turbidimeter adapted for using standard test tubes to hold the samples.

PRIOR ART

As is well known, a turbidimeter is a device for measuring the amount of solid material dispersed through a particular liquid. The accepted method for measuring turbidity is to shine a light at or through a sample of the liquid to be tested and to measure the amount that the contained particles disperse the light. In most commercial turbidimeters, the amount that the light is dispersed is measured as a ratio between the light received at a first photocell positioned to receive the light directly through the sample and the light received at a second photocell positioned to receive light from the same light source but only after it has been dispersed by the suspended particles in the sample.

Heretofore commercial turbidimeters available on the market have usually employed specially made glass flasks for holding the sample to be tested. As is the case with most specialty items, these flasks are not always available and when they are available, they are expensive.

SUMMARY OF INVENTION

It is, therefore, the primary object of the present invention to provide a turbidimeter which is adapted for using standard test tubes for holding the samples to be tested whereby its original purchase price and operating costs are relatively low as compared to the turbidimeters heretofore available.

The above and further objects of the invention are accomplished through the provision of a turbidimeter characterized by a test tube holding bracket essentially consisting of a pair of vertically spaced angled bars and spring means for urging a test tube outwardly against the angles of the bars and a particular type of flanged photocell holding unit for ensuring that the photocell measuring the dispersed light is properly positioned relative to each test tube even though there are optical and physical differences between the test tubes used.

The above and other objects of the invention will be more thoroughly understood from the folowing description of a preferred embodiment of the invention as read in conjunction with the accompanying drawings.

In the drawings which illustrate a preferred embodiment of the invention,

FIG. 1 is a side elevation view, partly in section, of a turbidimeter in accordance with the preferred embodiment of the invention;

FIG. 2 is a cross-sectional view taken along the line 2—2 of FIG. 1;

FIG. 3 is a cross-sectional view taken along the line 3—3 of FIG. 1, and

FIG. 4 is a cross-sectional view of a portion of a test tube showing the manner in which the apparatus may be adapted for continuous metering.

Referring to FIG. 1, the numeral 10 designates a frame for holding the illustrated parts. In the normal course this frame would be the bottom wall of a metallic meter box such as is commonly used in devices of this type. The numeral 12 designates a top wall of the box having an aperture 14 preferably having a collar 15 enclosed with a cap 16.

Within the box a light source 18 and a pair of photocells 20 and 22 constitute the turbidity measuring electromechanisms and it should be understood that this type of double photocell and light source method of measuring turbidimeter is well known in itself and that the present invention is concerned with the particular mechanical arrangement shown in the drawing which permits the use of standard test tubes in the double photocell method of measuring turbidity.

As suggested above the present invention primarily relates to the illustrated method for holding standard test tubes and for positioning the photocells so that the samples to be measured are always positioned in the same relative way with respect to the light source and the photocells. To this end the illustrated test tube holding arrangement consists of an upright 24 having a pair of angle bars 26 and a leaf spring arrangement 28 for pressing the test tube against the angles of the angle bars. A resilient material pad 30 supports the lower end of the test tube.

The test tube holding arrangement above described ensures that the test tube will always be held at right angles relative to the light beam originating at light source 18 and defined by an aperture 19 in partition 21. It further ensures that the test tube will always be positioned the same distance away from the light source each time a measurement is taken. In addition, in order to ensure that the test tube will always be in the same rotational position, it is marked with an indicator marking as shown at 31 which is aligned with a suitable datum marking 33 on the collar 15.

As can be seen in the drawings, photocell 22 being carried by a fixed upright 32, is always positioned in the same location relative to light source 18. If the other photocell were also located always in the same position, undesirable variations in readings would occur due to variations in the test tubes. However, as the measure of turbidity is a relative quantity, i.e. is a ratio of the light received at the two photocells, the variations in the test tubes are accommodated, in accordance with the present invention, by providing for predictable variations in the positions of photocell 20 relative to the light source 18. This is accomplished by mounting photocell 20 on a spring member 34 having a bearing element in the form of a flange 36 which bears against the outside surface of the test tube. Thus, as the photocell 20 is fixed in position relative to the outer edge of flange 36, it will always be spaced the same distance away from the outside surface of each test tube. Thus, to guarantee consistency of readings, it is required only to calibrate each test tube so that it is possible to place it in the meter in the same orientation each time it is used. Flange 36 serves another purpose. It is a guard which prevents damage to photocell when test tube is inserted.

To calibrate a number of test tubes each tube is filled with distilled water. The test tubes are then placed one at a time in the holding arrangement previously described. The apparatus is energized with a first tube in position and the meter is adjusted to obtain a zero reading. An index mark is placed on the tube relative of a datum mark on the instrument to ensure that not only the same vertical and horizontal positions will prevail when the tube is replaced in the instrument but also the same rotational position may be achieved. The remaining tubes are then placed in the meter and I have found that a zero reading can generally be obtained by rotating the tube in the bracket and taking advantage of the minor variations in the optical characteristic of the tubes. When a zero reading is obtained on the meter the tube is marked as described above so that it may be relocated in the same rotational position. This process is repeated with all of the tubes of a series. If a zero reading cannot be obtained then that tube is rejected or new zero reading established by selecting adjustment of the meter.

The object in calibrating each test tube is to see that each one will be placed in the meter when taking a reading in the same way each time so that such variations as occur in the thickness of the test tube wall and in the optical qualities of its glass will give the same effect to the reading each time the test tube is used.

In calibrating each instrument itself the procedure is to make a number of readings using standardization samples and fixing the initial position of photocell 20 by means of the adjustment screw 40. This adjustment takes into account variations from the norm within the photocell 20 itself and when this initial position of the photocell has been determined, the leaf spring 34 is fixed in position by means of cement 42. Once this initial position of the leaf spring and the photocell carried by it has been determined it is only required to calibrate each of the test tubes to be used in the meter concerned in the manner previously described. Thus the final position of photocell 20 varies with each test tube according to the way each test tube has been calibrated which is determined in turn by the physical and optical qualities of each test tube.

As shown in FIG. 4 the turbidimeter of the invention is easily adapted for continuous metering by replacing cap 16 with an apertured cap 46 whereby the liquid to be metered can be led in to the test tube by way of the input tube 48 and out of the test tube by way of the output tube 50.

The servicing of the apparatus when used as a device for measuring the turbidity of a continuous flow is made easy by the use of a standard test tube which can be removed and replaced in a matter of seconds. It has been found that a distorting film is deposited on the glass surface of the tubes used in a continuous flow device and in order to obtain accurate readings it is necessary to replace the tubes when the film causes a degree of inaccuracy which cannot be tolerated. In the known devices, the removal of the monitoring head for cleaning requires a considerably greater period of time than is required by the use of the tube and mounting method of the present invention. Conventional containers, such as test tubes, cannot be used in known turbidimeters as they do not provide any means for accurately and simply positioning a simple container in an operable position.

What I claim is:

1. A turbidimeter comprising a light source, a first photocell for measuring light received directly through a sample contained in a test tube, said first photocell being fixed in a permanent position relative to said light source, a bracket for holding a test tube with its longitudinal axis arranged at right angles to a light beam originating at said light source, and a second photocell for receiving light from said light source following scattering thereof by said sample, second photocell holding means adapted to accommodate variations in the optical qualities of the test tubes calibrated for use in the turbidimeter, and consisting of a spring element carrying said second photocell and biased towards said test tube holding bracket and carrying a bearing element which bears against the test tube held in said bracket as to position the second photocell a predetermined distance from the outer surface of the test tube and datum indicator means for alignment with a calibrated datum marking on the test tube for locating the calibrated rotational position of a test tube.

2. A turbidimeter as claimed in claim 1, in which said spring element which carries said second photocell comprises a substantially upright leaf spring having a flange at its upper end, said flange constituting said bearing element, said second photocell being fixed to the leaf spring on the test tube side thereof, said flange having a depth which exceeds the depth of said second photocell.

3. A turbidimeter as claimed in claim 2, in which said leaf spring includes means for adjusting and permanently fixing its initial orientation relative to said bracket whereby said turbidimeter can be calibrated to accommodate any variations from the norm inherent in said second photocell, or test tube.

4. A turbidimeter as claimed in claim 3, in which said adjusting means comprises a horizontally oriented U-shaped bend in said leaf spring at its lower end and screw means for moving the arms of said U-shaped bend towards and away from each other, said means for permanently fixing the initial orientation of the leaf spring comprising a quantity of hardenable cement placed between the arms of said U-shaped bend as to permanently hold the selected spacing therebetween.

5. A turbidimeter as claimed in claim 1, in which said bracket comprises a pair of vertically spaced angle bars and spring means for urging a contained test tube against the angles of the angle bars.

6. A turbidimeter comprising a light source, a first photocell for measuring light received directly through a sample contained in a test tube, said first photocell being fixed in a permanent position relative to said light source, a calibrated test tube for holding a sample, a bracket for holding said test tube with its longitudinal axis arranged at right angles to a light beam originating at said light source, and a second photocell for receiving light from said light source following scattering thereof by said sample, second photocell holding means adapted to accommodate variations in the optical qualities of said calibrated test tube and consisting of a spring element carrying said second photocell and biased towards said test tube holding bracket and carrying a bearing element which bears against said test tube held in said bracket as to position the second photocell a predetermined distance from the outer surface of said test tube and datum indicator means for alignment with a calibrated datum marking on said tube for locating the calibrated rotational position of said test tube, a removable closure plug for closing said test tube, input conduit means extending through said closure plug to discharge fluid adjacent the path of the light beam and output conduit means extending through said closure plug and communicating with the upper end of said test tube.

References Cited

FOREIGN PATENTS 720,055 12/1954 Great Britain.

S. CLEMENT SWISHER, Primary Examiner

J. W. ROSKOS, Assistant Examiner

U.S. Cl. X.R.

73—61; 356—208